Patented Oct. 3, 1922.

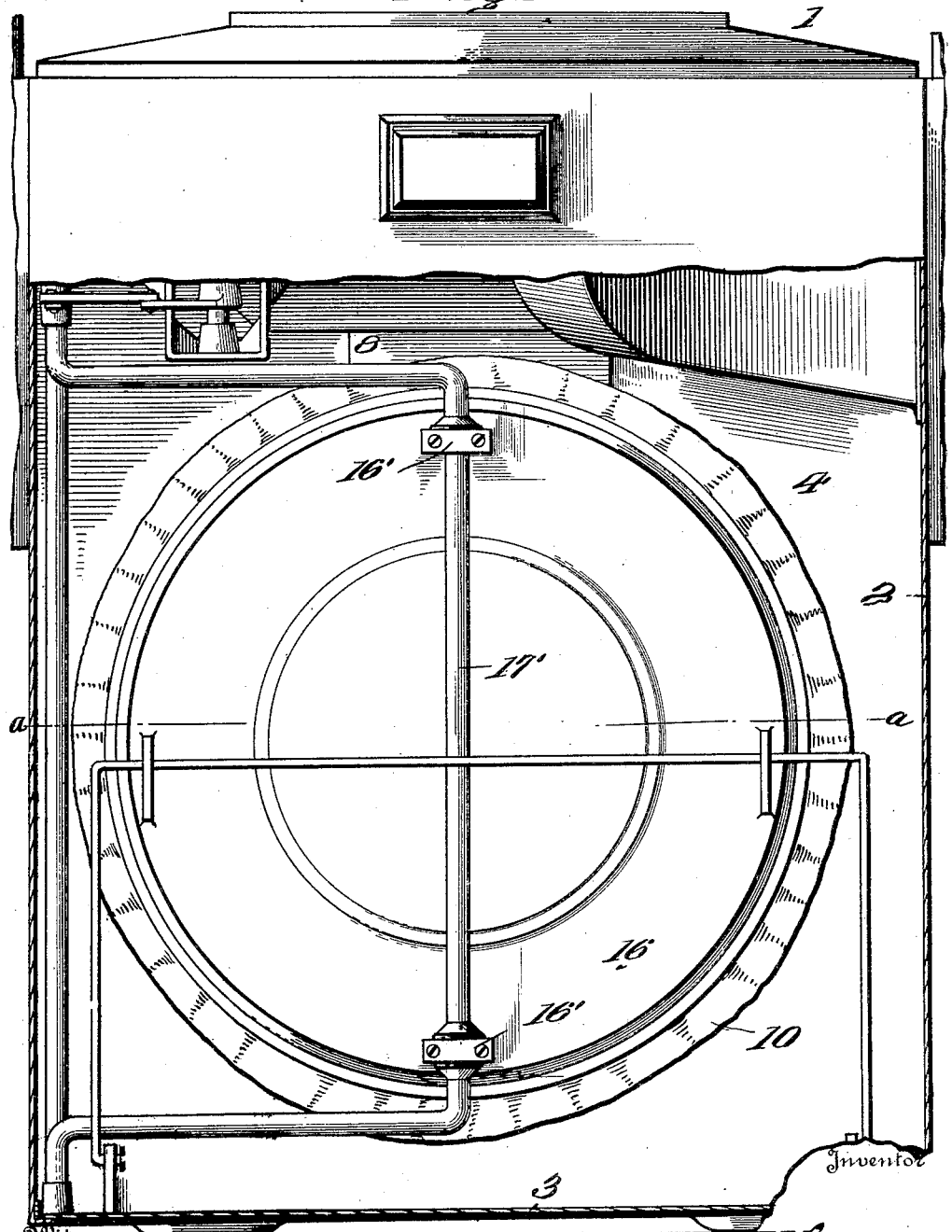

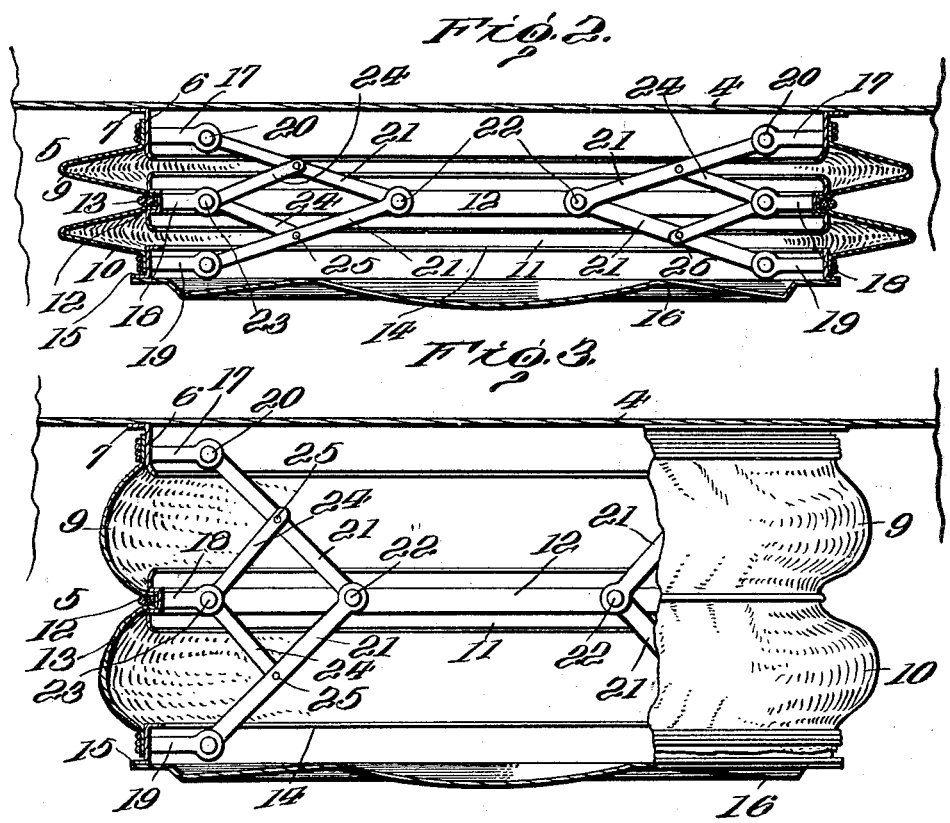
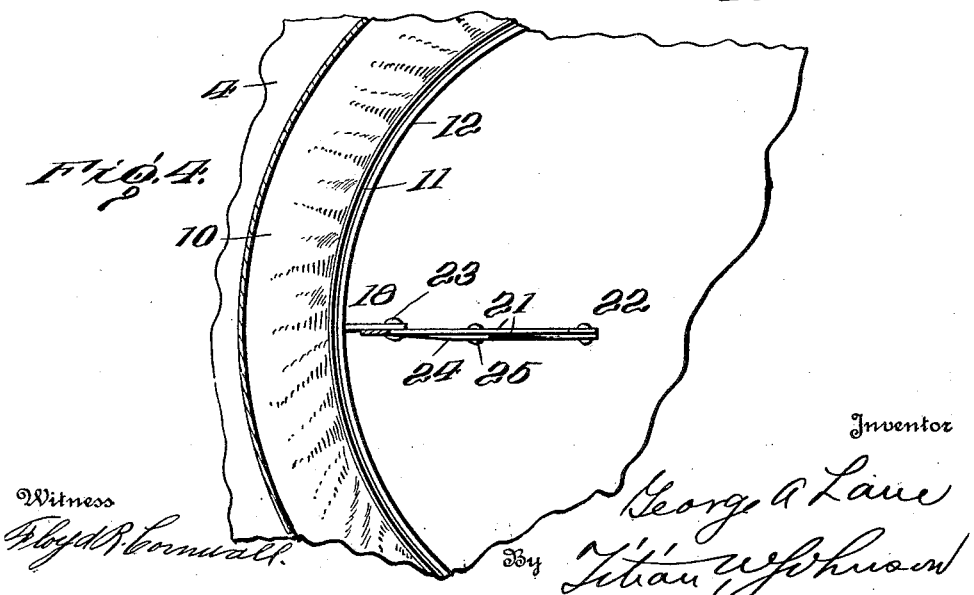

1,431,122

UNITED STATES PATENT OFFICE.

GEORGE A. LANE, OF CHICAGO, ILLINOIS, ASSIGNOR TO AMERICAN METER COMPANY, INCORPORATED, OF NEW YORK, N. Y., A CORPORATION OF DELAWARE.

GAS METER.

Application filed January 9, 1919. Serial No. 270,302.

*To all whom it may concern:*

Be it known that I, GEORGE A. LANE, a citizen of the United States, residing at Chicago, in the county of Cook and State of Illinois, have invented certain new and useful Improvements in Gas Meters, of which the following is a specification.

This invention relates to improvements in dry-type gas meters and more particularly to a mechanism for insuring equal and simultaneous expansion and contraction of all parts of a double diaphragm.

In the practical use of double diaphragms in dry-type meters and especially where the diaphragms are of very large size, consequently quite heavy, it has been found that the gas flowing into the diaphragm comes directly against the outer diaphragm plate and causes the outer section of the diaphragm to fill or become inflated in advance of the inner section, thus bringing about a lack of uniformity in the filling and expansion of the two bellows sections.

The object of the invention is to provide a means whereby it will be impossible for any section or part of a section of a double diaphragm to move, without moving the corresponding parts of the other section, so that uniformity in the expansion and collapse of the diaphragm is assured and equalized, in each diaphragm section.

In the drawings—

Figure 1 is a front view of a dry-type gas meter, the front plate being partially broken away, to illustrate the position of the diaphragm therein and connected flagstaff parts;

Figure 2 is a horizontal cross section taken about on line *a—a*, Figure 1, or at a point just above the center of the diaphragm, showing the diaphragm collapsed.

Figure 3 is a similar view showing the diaphragm expanded, and

Figure 4 is a broken detail horizontal section of one side of the diaphragm showing in edge elevation, the equalizing means.

Referring to the drawings, the numeral 1 designates a meter casing, 2 the sides, 3 the bottom thereof and the numeral 4 designates the central partition in the meter casing, which divides it into two diaphragm compartments, in each of which, in carrying out my invention, I place a double diaphragm 5. The diaphragms in each compartment are identical, and description of one will serve as description of both. Each diaphragm is attached to the partition in the usual way, and the diaphragms extend in opposite directions therefrom. The numeral 6 designates a metallic ring having flange 7 by which the diaphragm is attached to the partition. This ring is open at its inner side, through which opening gas from the diaphragm channel 8 can freely pass, the diaphragm channel 8 extending from the diaphragm port on the valve table to the diaphragm, as usual.

The diaphragm 5 is made in two leather sections 9 and 10, and the section 9 is cemented and tied to the ring 6 at one side, as usual. Intermediate between the two sections is a metallic ring 11 having an annular groove 12 therein, which forms a pocket for the central portion of the continuous leather, which forms in part the two sections of the diaphragm. This portion of the leather after equal division of the same has been arrived at, is tied into the pocket by cords 13, thus securely fastening the sections to the ring. The outer end of the bellows is filled by a ring 14, provided with a flange 15 to which is soldered, or otherwise secured, the outer plate 16 of the diaphragm, with bearings 16' for connection with the flagstaff 17', which flagstaff and connections, while being of peculiar construction and arrangement, need not be further referred to in this application, because they form the subject-matter of another application filed January 9, 1919, Serial Number 270,301.

The equalizing means employed is in the nature of a lazy-tongs, and two of such devices are employed, one on each side of the diaphragm, and they are identical in construction and in their manner of attachment to the various diaphragm ports, as will appear. The numerals 17, 18 and 19 designate three standards carried respectively by the rings 6, 11 and 14. To the standards 17 and 19 are pivoted at 20, two links 21 that have their other ends pivoted together as indicated at 22. Pivoted at 23 to the central standard 18 are two shorter links 24 that have their outer ends pivoted at 25 about centrally of the links 21. This description of the equalizing device has been confined to one of the devices, because as before stated, they are identical and description of one serves as description of both.

As shown the back ring 7 is supported by the partition and the front ring 15 and the outer diaphragm plate are supported by the flagstaff or flag wire, while the equalizing device is attached to the back, center and front rings 7, 11 and 15 in such manner as to support the center ring and prevent the diaphragm from sagging in the middle, thus facilitating the more uniform expansion and collapse of the diaphragm, and affording better cooperation with the lazy-tongs device whose primary purpose is to bring about the equalization and control of the movement of the center ring, and diaphragm as a whole. The arrangement is such that the movement of the center ring is about one-half as great as the movement of the front or outer ring.

By the arrangement shown, it will be seen that there is a positive connection between all of the rings and that there can be no movement of the outer ring without movement in corresponding direction of the center ring, although, as stated, the movement of the center ring is not so fast as the outer one.

While in the course of the foregoing description, the operation has doubtless been suggested, nevertheless perhaps, for a clearer understanding of the invention, it is described as follows:

Gas coming from above the valve table, through the diaphragm channel 8, will pass into the diaphragm adjacent to the partition 4, and in filling the diaphragm sections the standards 19 will be forced over from the stationary standards 17 on the inner ring, and by reason of the pivoted link connections with the standards 17, 18 and 19, the movement of the outer section of the diaphragm will be communicated in proportionate degree to the inner section, so that the diaphragm will uniformly fill and of course a reverse movement will bring about a uniform emptying of the diaphragm.

Having thus fully described my invention, what I claim is:—

1. In a gas meter, in combination, a double bellows diaphragm formed with an inner fixed, an outer and an intermediate ring, and mechanism having connection with all of the rings so that the intermediate and outer rings will be positively caused to move proportionately in the expanding and collapsing of the diaphragm.

2. In a gas meter, in combination, a double bellows diaphragm formed with an inner stationary ring, an outer movable ring, an intermediate ring through which communication is established between the bellows sections, said intermediate ring being formed with an annular external groove, forming a pocket for the leather portion of the diaphragm, means for retaining the central leather portion in the groove, and a mechanism connecting all of the rings, whereby the intermediate and outer rings are positively caused to move proportionately in the expanding and collapsing of the diaphragm.

3. In a gas meter, in combination, a double bellows diaphragm formed with an inner fixed ring, an intermediate ring, and an outer ring, and means on each side of the diaphragm having connection with all of the rings so that the intermediate and outer rings will be positively caused to move proportionately in the expanding and collapsing of the diaphragm.

4. In a gas meter, in combination, a double bellows diaphragm formed with an inner fixed ring, an outer and an intermediate ring, a standard carried by each ring, two links pivoted to the inner and outer standard and having their ends pivoted together, and links pivoted to the intermediate standard, and to each of the first mentioned links, whereby when the bellows is expanded or collapsed, a proportionate movement of the outer and intermediate rings will be caused.

In testimony whereof I affix my signature in presence of two witnesses.

GEORGE A. LANE.

Witnesses:
 GEO. D. BURNS,
 AL LINDE.